May 1, 1962   R. G. HOLMAN   3,031,906
STACKING MACHINE
Filed Oct. 30, 1956   6 Sheets-Sheet 3
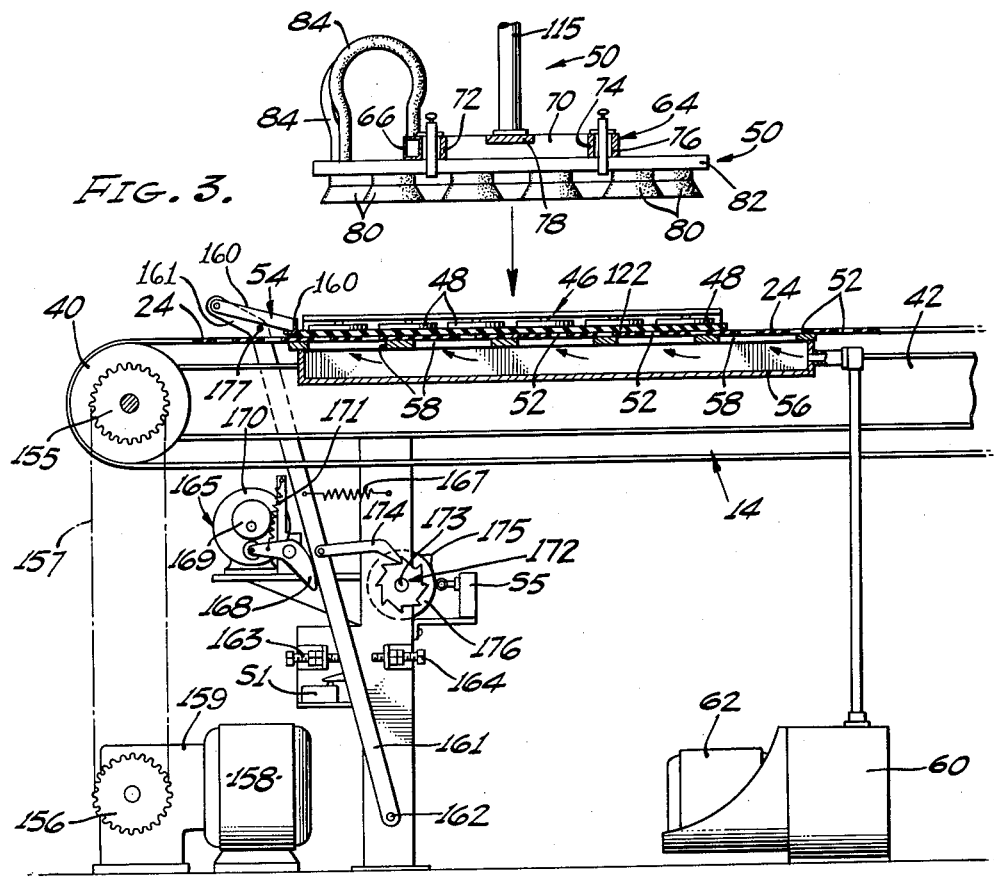
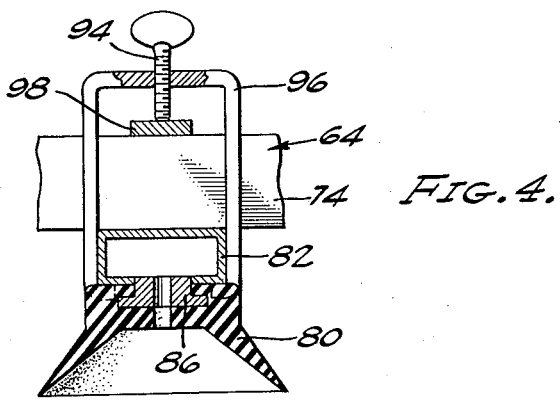
INVENTOR.
RUDOLPH G. HOLMAN
BY
ATTORNEY

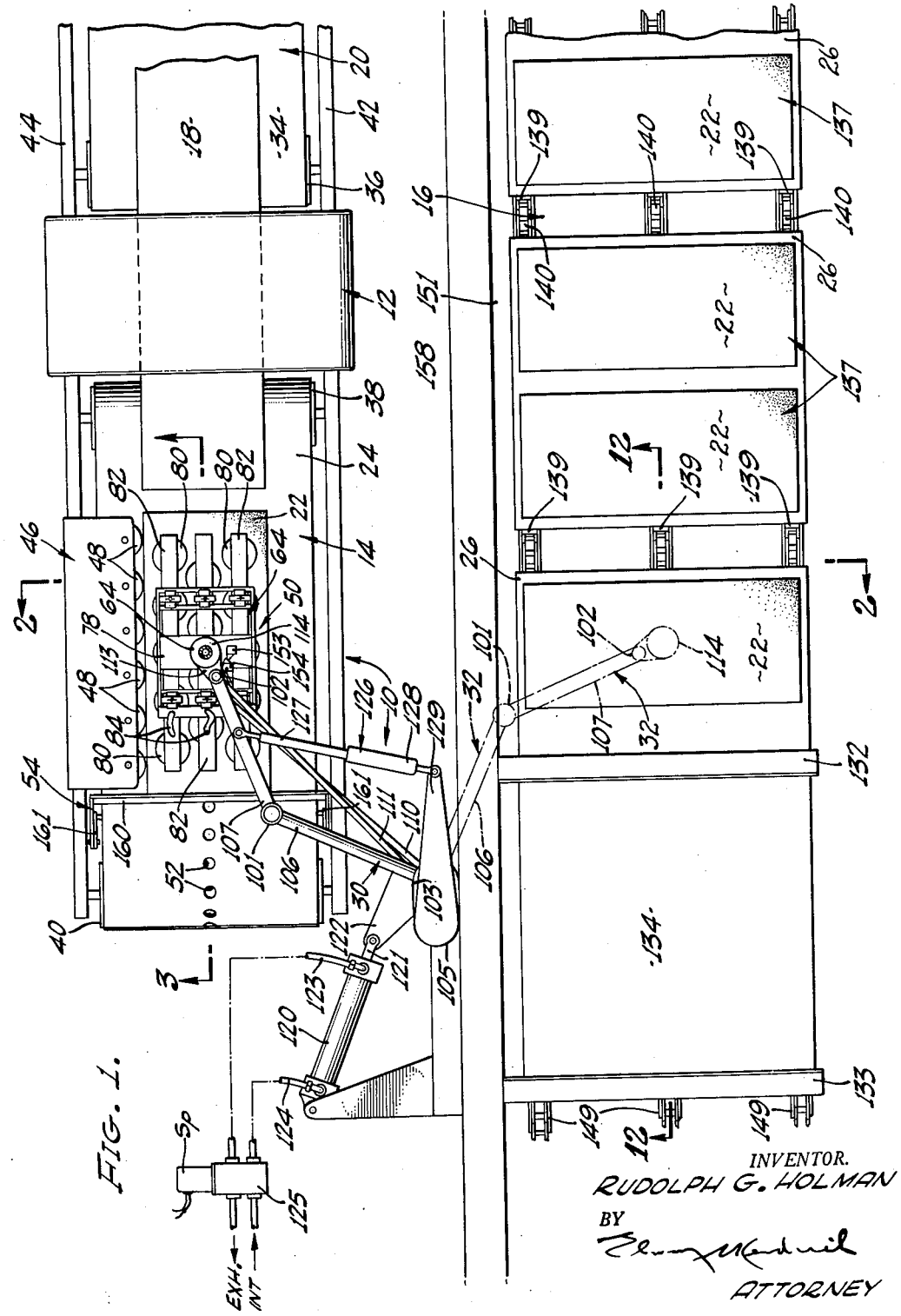

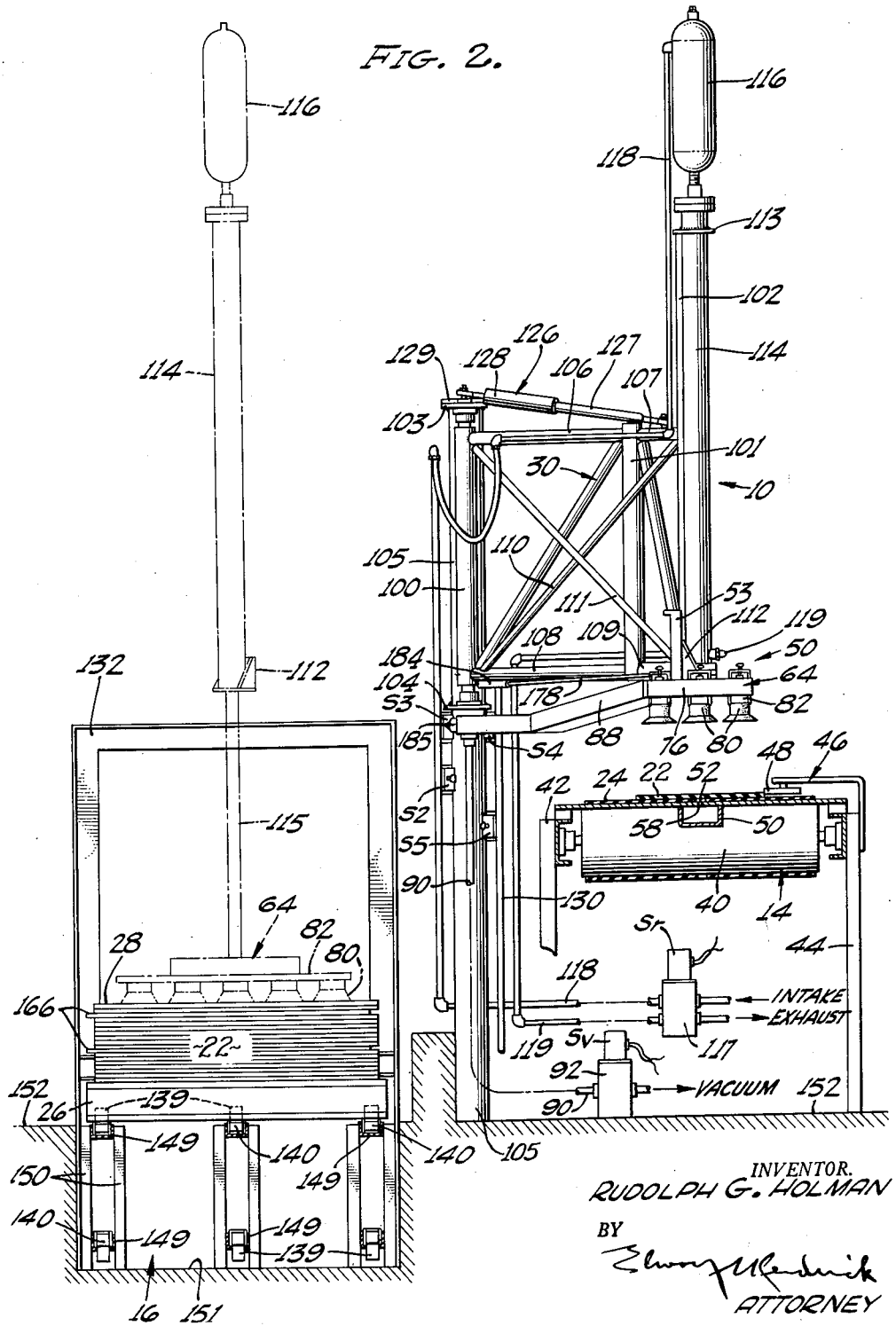

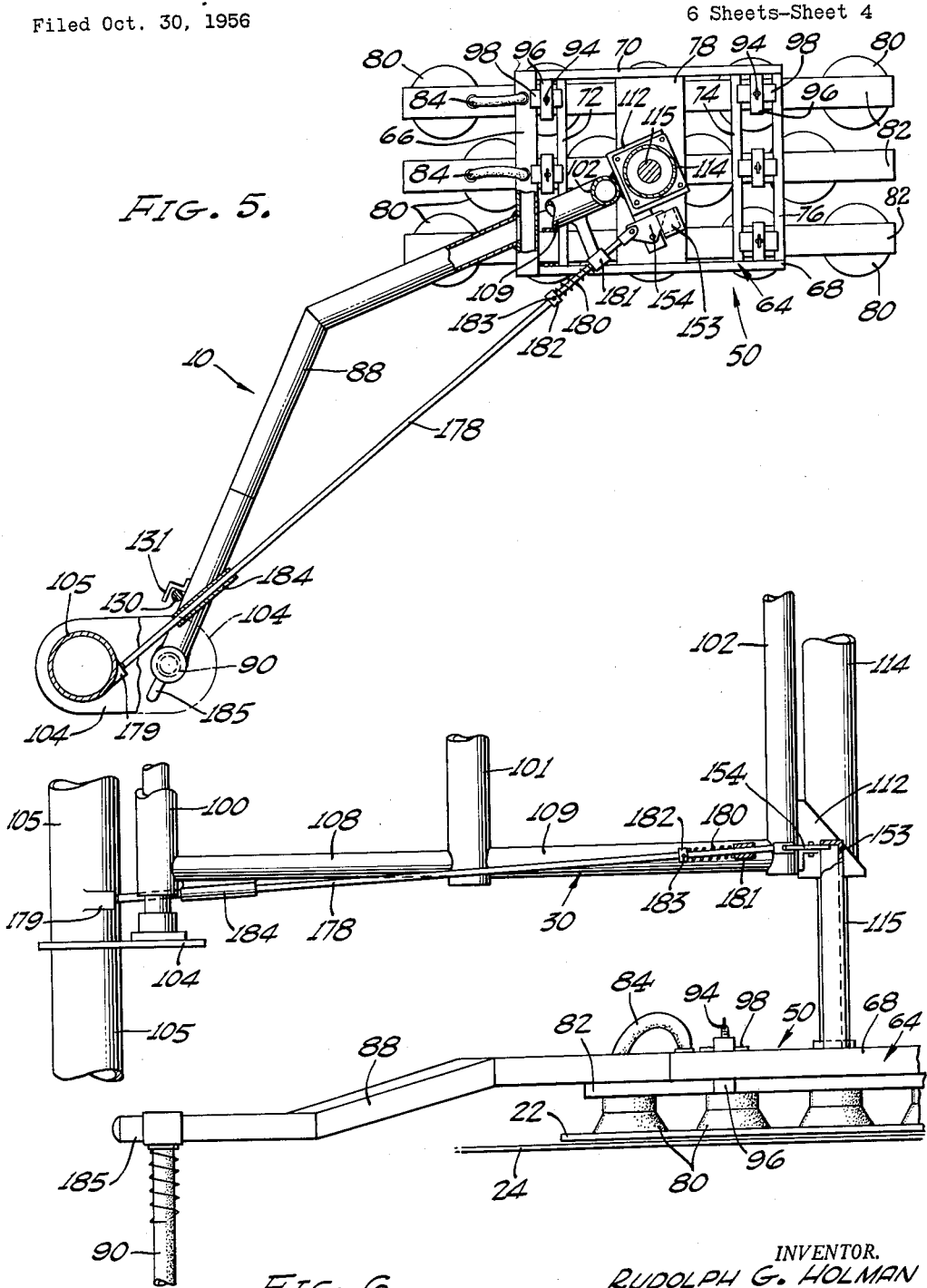

May 1, 1962  R. G. HOLMAN  3,031,906
STACKING MACHINE

Filed Oct. 30, 1956  6 Sheets-Sheet 5

INVENTOR.
RUDOLPH G. HOLMAN
BY
ATTORNEY

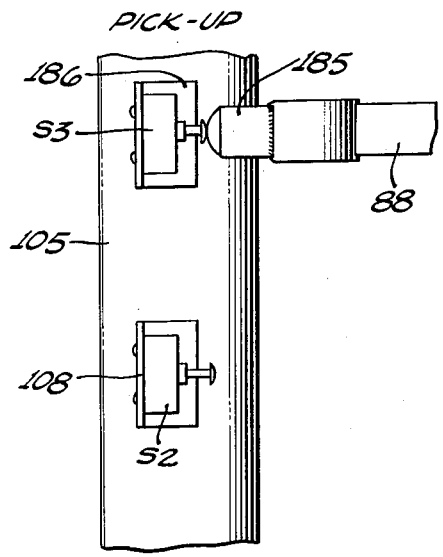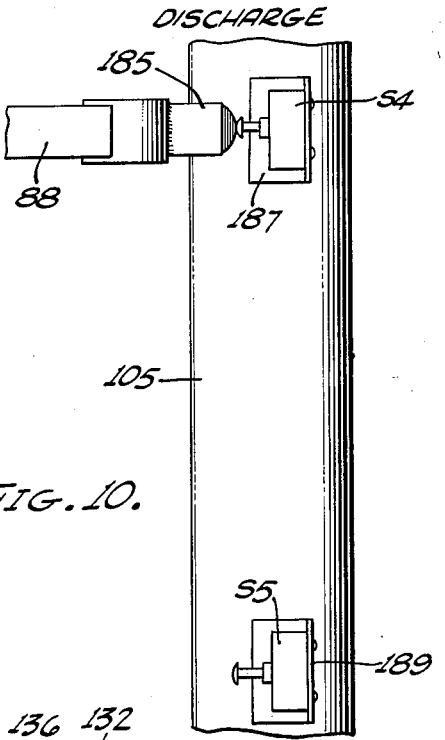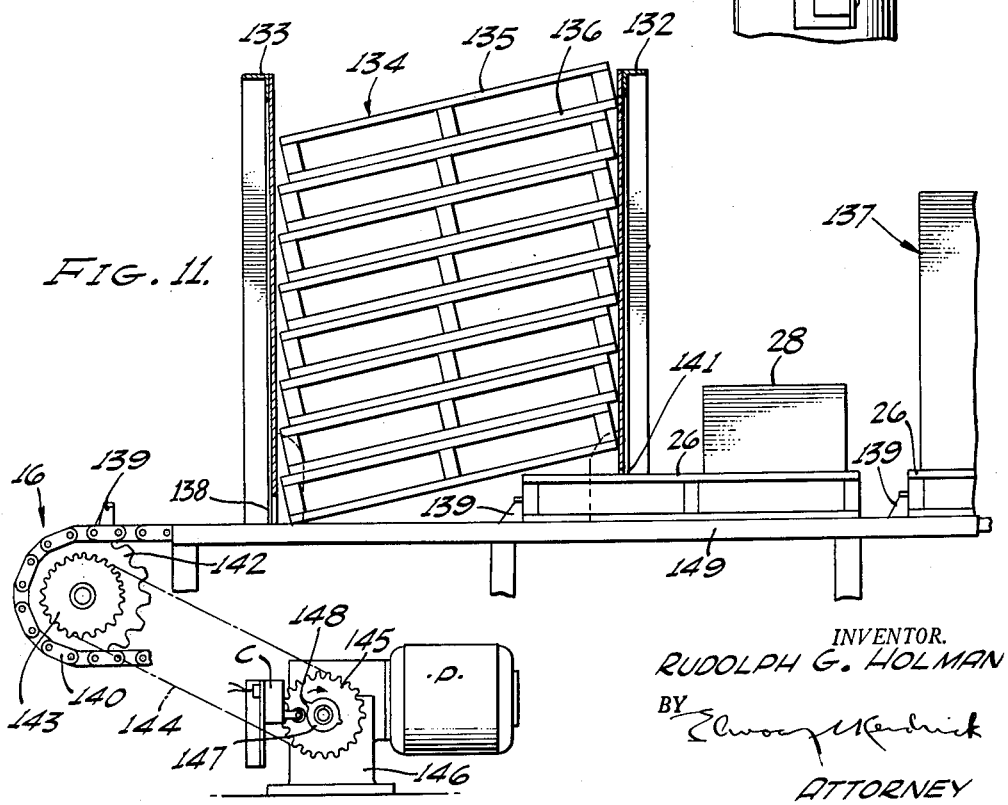

United States Patent Office 3,031,906
Patented May 1, 1962

3,031,906
STACKING MACHINE
Rudolph G. Holman, La Habra, Calif., assignor to W. J. Voit Rubber Corp., Los Angeles, Calif., a corporation of California
Filed Oct. 30, 1956, Ser. No. 619,301
10 Claims. (Cl. 83—94)

This invention relates to devices for stacking sheet material, and more particularly to a device for stacking flexible, tacky sheet sections made of, for example, a rubber composition used for making tread rubber known as camelback.

It is not uncommon for camelback material to be made in sheet form, cut into sections, and transported short distances through a manufacturing plant via a conveyor belt. However, it has been found desirable to provide more suitable means for transporting it greater distances.

The present invention solves the above-described and associated problems by providing a pickup head including resilient cup means, a pallet conveyor, first means to lower and raise the head selectively over the conveyor belt and the pallet conveyor and to move the head from a position spaced from and above the conveyor belt to a position spaced from and above the pallet conveyor, and second means to evacuate the resilient cup means when the head is disposed contiguous to the conveyor belt and for exhausting the resilient cup means to the atmosphere when the head is contiguous to the pallet conveyor. The resilient cup means, which may include a plurality of suction cups, operate substantially instantaneously and very efficiently to pick up camelback sheet sections and to put them down on a pallet on the pallet conveyor. The sheet sections thus are stacked so that they may be easily and efficiently transported to some other place or stored for some time.

According to a feature of the invention, the pallet conveyor is spaced a substantial first distance from the stacker head in its extreme upper position over the pallet conveyor to permit sheet sections to be stacked to a substantial height.

According to another feature of the invention, the pallet conveyor is positioned at floor level to permit removal of the pallets with the stacked sections thereon by fork trucks.

According to still another feature of the invention, the conveyor belt is spaced a second distance from the stacker head, the second distance being smaller than the first distance to increase the stacking speed of the machine. A safety feature is also provided in accordance with the invention, this feature including the previously described first means with a rotatable arm, a cylinder mounted vertically on the arm, and a piston in the cylinder to carry the head. According to this safety feature, the following additional means are provided: stop means fixed to the head, dog means fixed to the arm for engagement with the stop means to prevent the head from moving more than a predetermined distance towards the conveyor belt, and means to prevent engagement of the stop means by the dog means when the head is positioned over the pallet conveyor. Thus, the stacker head is prevented from moving into jamming engagement with the conveyor belt.

The sheet sections are picked up from the conveyor belt and appropriately positioned on the pallet conveyor by guide means for the head including a guide post fixed to the rotatable arm described above, and means fixed to the stacker head for vertical sliding engagement with the guide posts to prevent rotational movement of the head relative to the arm.

It is often necessary to count the number of sheet sections stacked by the stacking machine of the present invention in order to keep certain production records, to determine the proper time for testing the sections in association with quality control, or for other reasons. Such a device is also provided, in accordance with the invention, including a stop bar to hold a sheet section in a substantially stationary horizontal position on the conveyor belt, and means to position the stop bar in different horizontal positions periodically after a predetermined number of sections have been removed from the conveyor belt and stacked on the pallet conveyor, whereby the sections may be easily counted by noting the periodic offset of several of the sections by the periodic movement of the stop bar. Preferably, the stop bar is pivoted for rotational movement upwardly and away from the conveyor belt to prevent the sections from stacking up adjacent it and thereby jamming the machine, the stop bar having stop means mounted below it to prevent it from contacting said conveyor belt. The structure from which this stop bar is pivoted is also preferably pivoted, whereby actuation of a starting switch for the stacking machine may be actuated by movement of a section against the stop bar.

According to an important aspect of the invention, a device is provided for transporting the sheet sections whereby they may be picked up and stacked, this device comprising a perforated conveyor belt, and means disposed below the conveyor belt for blowing air upwardly through the perforations of the belt to partially support sheet sections by the air forced through the perforations.

This device keeps the sticky or tacky sheet sections from sticking to the conveyor belt when a sheet section is stopped by the above-described stop bar and when a sheet section is being picked up by the vacuum cups on the stacker head.

The invention also contemplates the use of a fixed support member having a bracket extending therefrom, first and second members pivotally connected from the arm and bracket respectively, and a dash pot connected between the first and second members, the arm being adapted to swing through an angle sufficiently large to cause the first member to move toward the second member and then to move away from it. This means that dash pot action may be provided at all necessary times without encountering a reversal in direction of the movement of the first member toward the second near either of the extreme limiting positions of the arm, such a reversal reducing the necessary dash pot action of the dash pot.

According to a further feature of the invention, a sequence control mechanism is provided for actuation of the first and second means, the mechanism comprising third means for actuating the first means to lower the head toward the conveyor belt only when the head is positioned directly above the conveyor belt and when a sheet section is positioned on the conveyor belt directly below the head, fourth means for actuating the first means to raise the head and for simultaneously actuating the second means to evacuate the resilient cup means when the head is contiguous to the conveyor belt, fifth means responsive to movement of the head to its upper extreme position above the conveyor belt but only at a time after the operation of the fourth means for actuating the first means to cause the head to swing from a position directly above the conveyor belt to a position directly above the pallet conveyor, and sixth means responsive to movement of the head to a position directly above the pallet conveyor for actuation of the first means to cause the stacker head to be lowered to the pallet conveyor and for actuation of the first means at a time sufficiently later to permit the head to travel to a position contiguous to the pallet conveyor to cause the head to return to its upper extreme position, the sixth means also actuating the second means to cause the resilient cup means to be exhausted to the atmosphere when the head is contiguous to the pallet conveyor. This feature is described in greater detail hereinafter.

According to another aspect of the invention, a device is provided for indexing the pallet conveyor to bring unloaded pallets under the stacker head in its unloading position. This device includes electrically operable power means to index the pallet conveyor when a stack of sections of a predetermined height is deposited thereon, a first relay, a switch actuable only in response to movement of the head to a predetermined height above the pallet conveyor, a first pair of normally opened contacts of the switch and a second pair of normally opened contacts of a time delay relay actuable on movement of the stacker head to a position above the pallet conveyor, the second pair of normally opened contacts being connected serially with the first relay, the first and second pairs of normally opened contacts both being connected serially with the first relay having a third pair of normally opened self-locking contacts and a pair of normally closed indexing contacts connected in parallel therewith, the indexing contacts being opened in response to movement of the pallet conveyor a predetermined indexing distance, the first relay having a pair of normally opened contacts connected serially with the power means, whereby the pallet conveyor is indexed a predetermined distance each time the fifth relay is energized. This feature is also described in greater detail hereinafter.

It is therefore an object of the invention to provide a stacking machine which operates quickly, easily, automatically, and efficiently.

It is another object of the invention to provide a stacking machine which permits removal of pallets stacked with elastomeric material sections by fork trucks.

It is still another object of the invention to provide a stacking machine adapted to stack sheet sections of elastomeric material in a manner by which they may be easily counted in groups.

It is a further object of the invention to provide a conveyor system for transporting sheet sections of sticky or tacky materials.

It is still a further object of the invention to provide a novel sequence control mechanism for a stacking machine.

Yet another object of the invention is to provide a pallet conveyor indexing control mechanism for moving unloaded pallets under the loading head of a stacking machine.

These and other objects and advantages of the present invention will be better understood when considered with the following description taken in connection with the accompanying drawings. The device of the present invention is by no means limited to the specific embodiment illustrated in the drawings since they are shown merely for purposes of description.

FIG. 1 is a plan view of the stacking machine of the invention and associated apparatus;

FIG. 2 is a front elevation of a stacking machine taken on line 2—2 shown in FIG. 1;

FIG. 3 is a sectional view of the starting and feeding apparatus of the stacking machine taken on line 3—3 shown in FIG. 1;

FIG. 4 is a broken away sectional view of a pickup head shown in FIGS. 1, 2, and 3;

FIG. 5 is a broken away sectional view of the rotating arm of the stacking machine shown in FIG. 1;

FIG. 6 is a broken away front elevation of the apparatus shown in FIG. 5;

FIGS. 7, 8, 9 and 10 are sectional and broken elevational views of limit switches employed in controlling the sequence of operation of the stacking machine shown in FIG. 1;

FIG. 11 is a sectional view of a pallet conveyor constructed in accordance with a feature of the invention.

Figure 7:
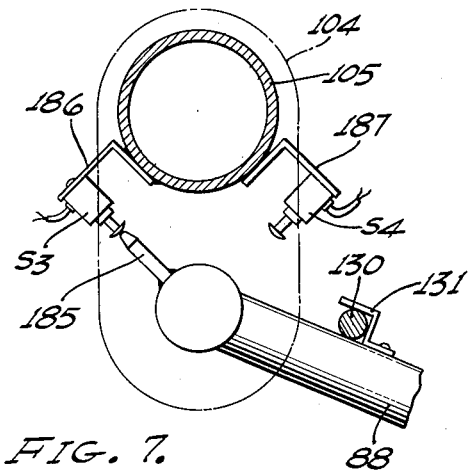

In the drawing in FIG. 1 the stacker is indicated generally at 10, a sheet cutter at 12, a section conveyor 14, and a pallet conveyor 16.

Uncured rubber, in sheet form, indicated at 18 is fed to cutter 12 by means of a conveyor system 20. After sheet 18 is cut into sections 22, sections 22 are fed to a conveyor belt 24 of conveyor 14 where they are picked up by stacker 10 and positioned on a pallet 26 as indicated at 28, stacker 10 having a swingable arm 30 which is swingable to the position indicated by dotted line 32 when stacker 10 is depositing section 28 on pallet 26.

The conveyor system 20 incluudes a conveyor belt 34 which rolls around a roller 36. Conveyor 14 includes belt 24, a forward roller 38 and a rear roller 40. All the rollers 36, 38 and 40 are rotatably mounted from left and right side frameworks 42 and 44.

A guide member 46 is fixed to a frame member 44 on which rolls 48 are rotatably mounted to cause each sheet section 22 to be placed precisely under a pickup head 50 of stacker 10.

The calendered rubber sheet 18 is normally sticky and would tend to stick to the conveyor belt 24. For this reason, apertures 52, FIG. 2, are provided in belt 24 to permit air to flow upwardly therethrough to levitate each sheet section 22. Air is forced upwardly through the apertures 52 at a rate to cause a sheet section 22 to levitate slightly, but not to an extent to cause the sheet section 22 to be positioned above the level of a stop bar assembly 54, FIGS. 1 and 3, which is employed to operate a starting switch S1 for stacker 10.

Compressed air is supplied to apertures 52 from duct 56, FIGS. 2 and 3, having longitudinal apertures 58. A blower 60 is employed to circulate air through pipe 56, a motor 62 being employed to drive blower 60.

Pickup head 50 is illustrated in some detail in all FIGS. 1 through 6. Framework 64, FIG. 5, includes a hollow common vacuum exhaust manifold 66, two longituidnal side members 68 and 70, three structural members 72, 74 and 76 extending across the framework 64 and a central member 78 by which the pickup head 50 is lowered and raised.

Section 22 are picked up by three rows of rubber suction cups 80, FIG. 4, connected to three vacuum ducts 82 opening into cups 80 through welded inserts 86. Ducts 82 and manifolds 66 are connected by conduits 84. Manifold 66 is exhausted by way of a conduit 88, FIG. 6, which extends over to the center of rotation of arm 30, FIG. 1, of the stacker 10. A hose 90, FIG. 6, is connected to the left end of the manifold 88 and to a valve 92, FIG. 2, operated by solenoid $S_v$. Each of the manifolds 82 with the row of suction cups 80 attached respectively to each may be adjustably positioned to the left or right or up or down as viewed in FIG. 1 simply by loosening a thumb screw 94, FIG. 4, which extends through a threaded bracket member 96, two of which extend around each of the manifolds 82. The lower end of the thumb screw 94 bears against a slidable plate 98 three of which extend across and on top of manifold 66, FIG. 3 and member 72 and three of which extend across and on top of members 74 and 76.

As best shown in FIGS. 2 and 6, arm 30 includes three vertical posts 100, 101 and 102, post 100 being pivoted from upper and lower fixed brackets 103 and 104, respectively. Brackets 103 and 104 are in turn fixed to a post 105 which is maintained in a fixed vertical position.

Arm 30 also includes a pair of upper horizontal beams 106 and 107 and a pair of corresponding lower horizontal beams 108 and 109. Cross pieces 110 and 111 are also provided for added strength. A shoe-shaped angle iron 112 is connected to vertical member 102 at its lower end and a corresponding flat plate 113 is connected to member 102 at its upper end. A cylinder 114 is then fixed to the plates 112 and 113, cylinder 114 having a piston, not shown, and a piston rod 115, FIGS. 3, 5 and 6, attached thereto to support pickup head 50 at member 78. A restricted orifice type snubber 116 is connected to the upper end of cylinder 114 and hydraulic power means, to operate piston 115, is connected through a valve 117, FIG. 2, and conduits 118 and 119 to cylinder 114, conduit 118 being connected to the upper end of snubber 116. A solenoid $S_r$ is provided to operate valve 117.

A cylinder 120 is shown in FIG. 1 internally of which a piston, not shown, is positioned and attached to a piston rod 121 connected to a plate 122 fixed to beam 108. As cylinder 120 is operated, piston rod 121 moves arm 30 from the position shown in FIG. 1 to the position shown in dotted lines 32 in FIG. 1. Cylinder 120 is operated by means of forward and rear input conduits 123 and 124 which are connected through a valve 125 operated by a solenoid $S_p$.

Figure 8:
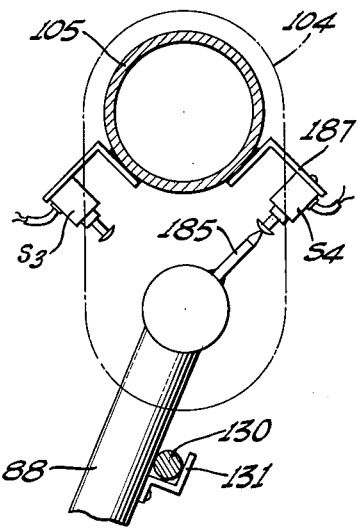

In order to prevent jerky movements of arm 30, a dash-pot snubber 126 is provided having a leg 127 connected to arm 30 and a leg 128 connected to a plate 129 which is fixed to plate 103. As arm 30 is rotated about the center of member 100, it is desirable to prevent rotational movement of pickup head 50 with respect to arm 30. For this reason, a vertical guide bar 130 is provided. Bar 130 is fixed to beam 108 and extends vertically downward therefrom. As indicated in FIGS. 5, 7 and 8, a bracket 131 is fixed to manifold exhaust member 88 to keep pickup head 50 in a fixed angular position with respect to arm 30 when head 50 moves upwardly and downwardly toward and away from either conveyor belt 24 or pallet conveyor 16.

Pallet conveyor 16, FIGS. 1 and 11, includes forward and rear stack holders 132 and 133 employed to house a stack of pallets 134. The pallets have upper and lower sheet members 135 and 136, the upper sheet member 135 being employed to support stacks of sections 28 forming a pallet batch 137 when a predetermined number of sections 28 is placed on a pallet. Member 133 has at least three apertures 138 to permit the passage of lugs 139 on three chains 140 which are employed to move the pallets 134 one at a time from under the stack included between the members 132 and 133. For this reason too, member 132 is provided with an aperture 141 sufficiently large to permit the passage of pallet 134 therethrough. Chain 140 engages a sprocket 142 which is fixed to a gear 143. The gear 143 is chain driven by a chain indicated only at dotted lines 144 which passes over a gear 145 fixed to a gear box 146 which is connected to a pallet conveyor motor P. A cam 147 is also fixed to the same shaft as gear 145, cam 147 having lugs 148 thereon to operate a limit switch C, the function of which will be explained in detail hereinafter.

As shown in FIG. 2, chains 140 are supported in troughs or channels 149 that are fixed to frame members 150 in a well 151. This means that pallets 134 may therefore be supported at floor level 152, FIG. 2, whereas conveyor belt 24 is supported at a level substantially above floor level by roller 40 which is rotatably mounted at a substantial height above floor level 152 on frame members 42 and 44. Preferably conveyor belt 24 is mounted as close to pickup head 50 as possible in order to reduce the time necessary to deposit section 22 on stack 28.

Rotational movement of arm 30 may be limited by the extreme limits of travel of the piston in cylinder 120; however, stop means 153 are preferably provided as shown in both FIGS. 5 and 6 to engage dog means 154 operable in response to the movement of arm 30 to its position shown in FIG. 1 to prevent movement of head 50 to a point below which cups 80 will contact the upper surface of conveyor belt 24. The function of this device and its mode of operation will be explained in greater detail hereinafter.

The drive mechanism for conveyor belt 24 and the starting mechanism for the stacking machine 10 is shown in FIG. 3. Conveyor belt 24 is driven by a motor 158 through a year box 159, gears 156, 155, roller 40 and chain 157. When sheet section 22 strikes stop bar 160, two side bars 161 on which stop bar 160 is pivoted, will rotate about their pivot point 162. Starting switch S1 will then be actuated. Stop means 163 and 164 are provided to limit movement of bars 161 in either direction, although stop means 163 need not necessarily be provided when a mechanism 165, FIG. 3, is provided to cause sheet sections to be stacked with periodic sheet sections offset, as indicated at 166 in FIG. 2. It is to be noted that members 161 are spring biased at 167 to bear against stop means 164. Thus, when sheet section 22 first strikes stop bar 160, bar 160 will be in its forward position at which time the arms 161 will be held against the forward stop 164 by spring 167 and a cam actuated arm 168 which at its opposite end bears against a cam 169 driven by a motor 170. The cam arm 168 is also biased to engage cam 169 by means of a spring 171. Motor 170 is energized and cam 169 rotated 180 degrees every time eight sections 22 are stacked on pallet conveyor 16. This is obtained by means of a ratchet 172 rotatively mounted on a pin 173 and operated by a pawl 174 rotatably mounted on members 161 to operate a limit switch S5 by a projection 175 on a cam 176 fixed to ratchet 172. Switch S5 is used to control the operation of motor 170 in a manner to be explained in greater detail in connection with the wiring diagram of FIG. 12. A pair of stops 177 is provided on members 161 to prevent stop bar 160 from rotating to a position in contact with the upper surface of conveyor belt 24.

Stop bar 160 is rotatably mounted on members 161 to prevent the conveyor system from jamming in case a pile of sections 122 should happen to become stacked against the stop bar 160.

Referring to FIGS. 5 and 6, it is to be noted that dog means 154 should be withdrawn and should not engage stop means 153 when pickup head 50 is over pallet conveyor 16, because it is desired that pickup head 50 should extend downwardly and be positioned contiguously to pallet 26 when section 22 is being deposited thereon. For this reason, a rod 178 is pivotally mounted to dog means 154 and is pushed forward by a second stop means 179, fixed to post 105, when arm 30 is in the position shown in FIG. 1. When arm 30 moves to the position indicated at 32 in FIG. 1, rod 178 will be rotated to a position out of engagement with both stop 179 and post 105. A spring 180 is provided at the right end of rod 178 to bear against a follower 181 fixed to beam 109 and a follower 182 fixed by a screw 183 to rod 178. A hollow cylindrical guide 184, FIGS. 5 and 6, is fixed to beam 108, FIG. 6, to guide axial movement of rod 178 with respect thereto. It is to be noted that stop means 153 is also fixed to member 78 and pickup head 50.

Referring to FIGS. 7, 8, 9 and 10, the end of exhaust manifold member 88 is provided with a switch actuating projection 185 which is also shown in FIGS. 2, 5 and 6. FIG. 7 shows projection 185 when arm 30 is in the pickup position and FIG. 8 shows projection 185 when arm 30 is in the discharge position. Projection 185 actuates limit switch S3 fixed to bracket 186 that is in turn fixed to post 105 when arm 30 is in pickup position. Projection 185 actuates a different limit switch S4 fixed to a bracket 187 that is in turn fixed to a post 105 when arm 30 is in the discharge position. A switch S2 is fixed to a bracket 188 that is in turn fixed to post 105 directly below switch S3 as indicated in the broken elevation view of FIG. 9. Similarly, a limit switch S5 is fixed to a bracket 189 that is in turn fixed to post 105 directly below limit switch S4.

Figure 12:
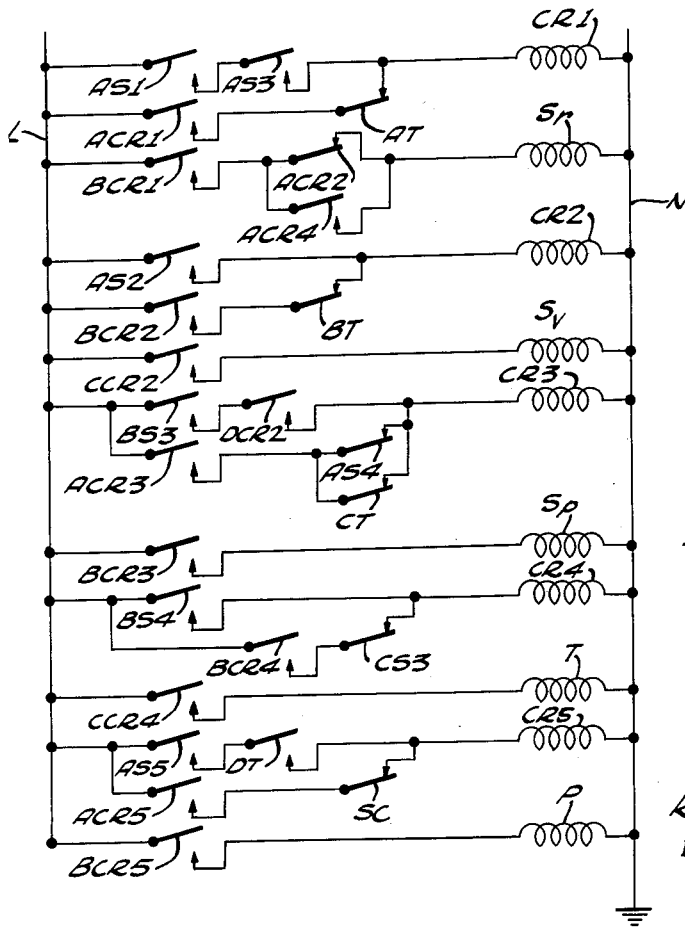
FIG. 12 is a wiring diagram of the electrical sequencing control mechanism of the invention.

In FIG. 12, positive and ground electrical buses L and N are shown between which several circuits are connected. A relay CR1 is shown connected between these leads to energize ram solenoid $S_r$. A relay CR2 is shown for energizing vacuum solenoid $S_v$ and for de-energizing ram solenoid $S_r$. A relay CR3 is shown connected between the electrical buses L and N for energizing arm cylinder solenoid $S_p$. Still a fourth relay CR4 is shown connected to energize a time delay relay armature T. A fifth relay CR5 is shown connected in a manner appropriate to energize pallet conveyor motor P. Switches S1 and S3 are shown having normally opened contacts AS1 and AS3, respectively, connected serially with relay CR1. AS1 simply starts the stacking machine procedure. The normally open contacts AS3 of limit switch S3 are connected serially with the normally open contacts AS1 of switch S1 in order to prevent solenoid $S_r$ from being energized before head 50 is positioned directly above the conveyor belt and spaced therefrom. It is to be noted that when solenoids $S_r$, $S_v$ and $S_p$ are energized, the ram will be forced downwardly, a vacuum will be created in the vacuum cups, and the arm will be rotated in a manner such that the stacker head will be positioned directly over the pallet conveyor, respectively. A pair of normally open contacts ACR1 of relay CR1 are shown connected serially with a pair of normally closed contacts AT of time delay relay T, the contacts ACR1 and AT being connected in parallel with the normally open contacts AS1 and AS3 of switches S1 and S3. The normally closed contacts AT are opened a predetermined time after relay CR4 is energized, this being the time during which the stacker head is permitted to be lowered over the pallet conveyor to a position contiguous to the top of the sheet section stack whether the stack be low or high.

Solenoid $S_r$ has a pair of normally opened contacts BCR1 of relay CR1, a pair of normally closed contacts ACR2 of relay CR2, and a pair of normally opened contacts ACR4 of relay CR4. Contacts BCR1 and BCR2 are in series with $S_r$ and contacts ACR2 are in parallel with AT.

Relay CR2 is energized by normally opened contacts AS2 of switch S2. Relay CR2 is provided with normally opened contacts BCR2 which are connected serially with a second pair of normally closed contacts BT of time delay relay T. The normally opened contacts of relay CR2 and the normally closed time delay relay contacts are then connected in parallel with normaly opened contacts AS2 of switch S2. Vacuum solenoid $S_v$ is energized by a pair of serially connected normally opened contacts CCR2 of relay CR2. Relay CR3 may be energized only when relay CR2 is energized and for this reason is provided with serially connected normally opened contacts BS3 of switch S3 and normally opened contacts DCR2 of relay CR2. Normally opened self-locking contacts ACR3 of relay CR3 are serially connected with normally closed contacts AS4 of switch S4, this series connection being made parallel with the normally opened contacts BS3 of switch S3 and normally opened contacts DCR2 of relay CR2. A pair of normally closed contacts CT of time delay relay are also connected in parallel with the normally closed contacts AS4 of switch S4.

A pair of normally opened contacts BCR3 of relay CR3 are connected serially with the winding of solenoid $S_p$ to energize it when relay CR3 is energized. Relay CR4 is energized by closing a pair of normally opened contacts BS4 of switch S4. Relay CR4 is also provided with a pair of normally opened contacts BCR4 which are connected serially with a pair of normally closed contacts CS3 of switch S3, both of which are connected in parallel with the normally opened contacts BS4 of switch S4. Relay CR4 also has a pair of normally opened contacts CCR4 connected serially with the winding of time delay relay T. Relay CR5 is energized by actuation of switch S5, a pair of normally opened contacts AS5 being serially connected with relay CR5 and a pair of normally opened contacts DT of time delay relay T. Relay CR5 is provided with a pair of self-locking contacts ACR5 which are serially connected with a pair of normally closed contacts SC of switch C on the indexing mechanism of the pallet conveyor motor P. Pallet conveyor motor is energized when relay CR5 is energized, a pair of normally opened contacts BCR5 of relay CR5 being serially connected with the pallet conveyor motor P.

In the operation of the sequence control mechanism shown in FIG. 12, the normally opened contacts AS1 are closed when a sheet section 22 bears against the stop bar 54. Thus, if the stacker head 50 is positioned directly above conveyor 24 and spaced therefrom at its upper extreme position, normally opened contacts AS3 of switch S3 would also be closed. Hence, relay CR1 will be energized and the normally opened relay-locking contacts ACR1 of relay CR1 will keep relay CR1 energized until the normally closed contacts AT of time delay relay T are opened.

Energization of relay CR1 then causes energization of ram solenoid $S_r$ through normally closed contacts ACR2 of relay CR2. Energization of solenoid $S_r$ then causes the stacker head 50 to lower to a position contiguous to the conveyor belt 24, the movement of the head 50 toward the conveyor belt 24 being limited by the engagement of stop means 153 with dog means 154. When the head 50 moves to a position contiguous to conveyor belt 24, switch S2 is actuated and its normally opened contacts AS2, serially connected with relay CR2, close, which causes relay CR2 to be energized and to self-lock through its normally opened contacts BCR2 and the normally closed contacts BT of time delay relay T. Energization of relay CR2 also causes energization of solenoid $S_v$ and a de-energization of solenoid $S_r$. De-energization of solenoid $S_r$ causes the head 50 to move upwardly away from the conveyor belt 24. Energization of solenoid $S_v$ causes a vacuum to be created in suction cups 80. However, the vacuum is created at a much faster rate than the head moves upwardly away from the conveyor belt 24. Hence, no problem is involved in the simultaneous energization of solenoid valve $S_v$ and deenergization of solenoid valve $S_r$.

When the head 50 reaches its upper limiting position above the conveyor belt 24, switch S3 is again actuated and the normally opened contacts BS3 connected serially with the normally opened contacts of DCR2 of relay CR2 and in series with the winding of relay CR3 energizes relay CR3, this relay shelf-locking through its own normally opened contacts ACR3 and normally closed contacts AS4 of switch S4 or time delay relay T. Energization of relay CR3 then causes solenoid $S_p$ to be energized and thereby causes arm 30 to move to its opposite extreme limiting position bringing the head 50 directly above the pallet conveyor 16. After the arm 30 moves to this position, switch S4 is actuated and its normally opened contacts BS4 close, this thereby energizing relay CR4, which self locks through its own normally opened contacts BCR4 and a pair of normally closed contacts CS3 of switch S3. Energization of relay CR4 causes energization of time delay relay T. However, all normally opened and closed contacts of time delay relay T are not reversed in their respective states until a predetermined time later sufficient for a head 50 to travel all the way from its upper limiting position to a pallet 134 on the pallet conveyor 16. When the switches of time delay relay T reverse themselves, relays CR1 and CR2 are de-energized. This means that solenoids $S_r$ and $S_v$ are de-energized and simultaneously the interior of the suction cups 80 are connected to the atmosphere and the head 50 is returned to its upper extreme limiting position above the pallet conveyor 16, the cups 80 being connected to an atmospheric pressure at a substantially instantaneous rate. It is to be noted that during this time solenoid $S_p$ is not de-energized and that therefore arm 30 will remain in its extreme limiting position over the pallet conveyor 16. As soon as the head 50 reaches its upper limiting position above the pallet conveyor, switch S4 will be actuated and the normally closed contacts AS4 serially connected with the self-locking contacts ACR3 of relay CR3 will be opened. As stated previously, by this time the normally closed contacts CT of time delay relay T, in parallel with contacts AS4 of switch S4, will also be opened. This means that relay CR3 will be de-energized. Hence, solenoid S$_p$ will be de-energized and the arm 30 will return to its position over the conveyor belt 24. It is to be noted that after all the normally closed and opened contacts of time delay relay T reverse their position, they will not again reverse their position until the winding of time delay relay T is de-energized. This occurs when relay CR4 is de-energized. Relay CR4 is de-energized when switch S3 is actuated. Obviously, from the position of switch S3, it is actuated when arm 30 returns to its waiting position over conveyor belt 24.

The utility of all the relays and solenoids will be obvious from the above description of the operation of the sequence control mechanism. However, the use of several of the normally closed contacts to the relays will not be obvious at first glance. In the first place, it may not be obvious why it is necessary to incorporate the normally opened contacts AS3 of switch S3 serially with the normally opened contacts AS1 of switch S1 and the winding of relay CR1. This is done as a safety measure in order to prevent relay CR1 and thereby solenoid valve S$_r$ from being energized except when arm 30 is in the waiting position directly above conveyor belt 24.

The normally opened contacts ACR4 of relay CR4 connected in parallel with the normally closed contacts ACR2 of relay CR2 which is serially connected with the normally opened contacts BRC1 of relay CR1 and solenoid S$_r$ are employed to energize solenoid S$_r$ while relay CR2 is energized. This is desirable since the energization of relay CR2 only indicates that a camelback sheet section has been picked up by the stacker head 50 and that some other detecting device must cause the head to lower over the pallet conveyor 16.

The normally opened contacts DCR2 of relay CR2 serially connected with the normally opened contacts BS3 of switch S3 and relay CR3 are provided to prevent relay CR3 and thereby solenoid S$_p$ from being energized except after the head 50 has been lowered over the conveyor belt 24, this function being indicated by energization of relay CR2. In other words, it would be undesirable to energize relay CR3 when head 50 is in the waiting position and switch S3 is actuated. It is necessary to de-energize relay CR3 when S4 is actuated. However, S4 is actuated twice during the operation of the stacker. It is actuated first before the head 50 is projected downwardly to the pallet conveyor 16 to deposit a sheet section 22 and again when the head 50 is raised to its upper limiting position above the pallet conveyor 16. Hence, it is necessary to provide means to keep relay CR3 self locked through its normally opened relay-locking contacts ACR3 when switch S4 is actuated the first time. This is accomplished by providing a pair of normally closed contacts CT of time delay relay T in parallel with the normally closed breaking contacts of switch S4 which are connected in series with the relay-locking contacts of relay CR3. It is to be noted that the normally closed time delay relay contacts CT are not opened until after the head 50 has been lowered to a pallet 134 on the pallet conveyor 16. Hence, actuation of switch S4 the first time as a camelback sheet section 22 is being deposited on the pallet conveyor 16 will not cause relay CR3 to be de-energized.

Normally closed contacts CS3 of switch S3 are connected serially with the relay-locking contacts BCR4 of relay CR4 in order to de-energize both it and time delay relay T. It is preferable to use the normally closed contacts CS3 of switch S3 for this purpose; however, it is not absolutely necessary, and it is to be noted that a pair of normally closed contacts of time delay relay T itself may be substituted. However, in order to avoid any unnecessary complications due to the time it would take for relay CR4 to de-energize and for the armature of time delay relay T to fall out, the normally closed contacts CS3 of switch S3 are connected in this manner.

The relay CR5, in combination with motor P in the circuitry shown in FIG. 12, provides an indexing mechanism for a pallet conveyor 16. Specifically, normally open contacts AS5 are employed to energize relay CR5 when at the same time, normally open contacts DT of time delay relay T are closed. This would occur when a stack of a predetermined height of sheet sections has been deposited on pallet 134 on conveyor 16. Relay CR5 is relay-locking through normally open self-locking contacts ACR5 and normally closed contacts SC. Pallet conveyor motor P is started by normally opened contacts BCR5 of relay CR5, and, after indexing to open contacts SC, causes relay CR5 to be de-energized. It is to be noted that preferably the indexing time of motor P is greater than the time required to return the head to its waiting position above the conveyor belt 16, this being required since normally opened contacts of time delay relay T are open only at a time when switch S3 is actuated and head 50 is in its waiting position.

In accordance with a feature of the invention, suction cups 80 are provided especially to pick up sticky sheet material such as camelback. It has been found that to the present time this is the only efficient way actually to pick up sticky sheet materials. It is obviously necessary that the pallet conveyor 16 be located a substantial distance below the upper limiting position of the head 50 in order that camelback sheet sections may be stacked on one of the pallets 134.

In accordance with a feature of the invention, the pallets 34 are moved at ground level by the pallet conveyor 16. By use of the pallets having spaced structural members 135 and 136, fork trucks thus can be employed to remove the pallets 134 after they are loaded with stacks of camelback sheet sections as indicated at 137. As stated previously, preferably conveyor belt 24 is located substantially closer to arm 30 than is pallet conveyor 16 in order to increase the stacking speed of the machine 10.

According to a feature of the invention, the stop means 153 and dog means 154 are incorporated with actuating means or rod 178 to prevent stacking head 50 from damaging the conveyor system 14.

According to an aspect of the invention, the guide rod 130 is provided to prevent rotational movement of head 50 with respect to arm 30. The starting and offset mechanism shown in FIG. 3 offsets sheet sections as indicated at 166 in FIG. 2 which also makes it a simple matter to count the number of camelback sheet sections 22 in a stack 137. It may be desirable to do this for other reasons, for example, for test purposes as needed in quality control, to keep production records, or for other reasons.

As explained previously, the rotatable mounting of stop bar 160 on members 161 also prevents the stacking machine 10 from becoming jammed up if camelback sheet sections 22 are piled up adjacent the stop bar 160. The use of the apertured conveyor belt 24 with means to force the means or pipe 58 to force air upwardly through to levitate the camelback sheet sections 22 is also an important feature of the invention, whereby sticky sheet materials may be easily picked up and deposited on the pallet such as one of the pallets 134. As can be seen from the view of snubber 126 in FIG. 1, the snubber will change directions midway in the swing of arm 30. This means that dash pot action will be adequately provided as arm 30 reaches its limiting position with head 50 above conveyor belt 24 with it above pallet conveyor 16.

Of course use of the many facets of the sequencing control mechanism illustrated in a diagrammatic view of FIG. 12 will be valuable. For example, the automatic pallet conveyor indexing mechanism is an extremely simple but time saving device.

Although one specific embodiment of the invention has been illustrated, it will be appreciated by those skilled in the art that many changes and modifications of the invention may be made without departing from the true scope thereof as defined by the appended claims.

What is claimed is:

1. An apparatus for making, cutting, stacking and transporting elastomeric material originally appearing in a continuous sheet form, including means for cutting said sheet into sections, a first conveyor to transport said sections after they are cut to a first, pickup position for transferring, stacking and turning said sections from said first position to a second position, said second position being at a different level and at a predetermined angle with respect to said first position, said machine being positioned between said first and second positions and having a rotatable pickup head including resilient cup means; a second conveyor including said second position, first means for lowering and raising said head selectively first over said first position and then over said second position and for moving said head from a first head position spaced a first distance from and above said first conveyor to a second head position spaced a second distance from and above said second conveyor, second means to evacuate said resilient cup means when said head is at said first head position and for connecting said cups to an atmospheric pressure when said cup means and said head are at said second head position, a stop bar to hold a sheet section in said first position on said first conveyor, means to position said stop bar in a different horizontal position periodically after a predetermined number of said camelback sheet sections have been removed from said first conveyor and stacked on said second conveyor, whereby said sheet sections may be easily counted by noting the periodic offset of several of said sheet sections by the periodic movement of said stop bar, and means for rotational and upward movement of said stop bar away from said first conveyor to prevent said sheet sections from stacking up adjacent said bar and thereby jamming the machine, said stop bar having stop means mounted below said bar to prevent said bar from contacting said first conveyor.

2. An apparatus for stacking sections of elastomeric material, including means for making a continuous sheet of said material, means for cutting said sheet into sections, a conveyor belt to transport said sections after they are cut, and a machine for stacking said sections, said machine including a pickup head having resilient cup means, a pallet conveyor, first means for lowering and raising said head selectively first over said conveyor belt and then over said pallet conveyor and for moving said head from a first position above and spaced from said conveyor belt to a second position above and spaced from said pallet conveyor, and second means for evacuating said resilient cup means when said head is in said first position and for connecting said resilient cup means to the atmosphere when said head is in said second position, a device for causing said machine to stack said sections in a stack with a predetermined number of said sections being stacked in an offset position for facilitating counting said sections in groups, said device comprising: a stop bar to hold a section in a substantially stationary horizontal first position on said conveyor belt, and means for positioning said stop bar in a different second horizontal position periodically after a predetermined number of said sheet sections have been removed from said conveyor belt and stacked on said pallet conveyor, whereby said sheet sections may be easily counted by noting the periodic offset of several of said sections in said stack.

3. A stacking machine including means for cutting a continuous sheet into sections, a first conveyor to transport said sections to a first position, a pickup head including cup means, a second pallet conveyor, first means for lowering and raising said head over said first and second conveyors and to move said head from said first position spaced from and above said first conveyor to a second position spaced from and above said second conveyor, and second means for connecting said cups to a source of vacuum when said head is in said first position and to an atmospheric pressure when said head is in said second position, said first means including third means for actuating said first means to lower said head toward said first conveyor to pick up a section of said sheet when one of said sections is positioned below said head in said first position, said third means including a stop bar positioned across and normally at the level of said sections and moved by said sections at the time said sections move into said first position, whereby said sections normally strike said stop bar and move said bar into a first, rearward position, spring means for advancing said bar into a forward position upon removal of said section by said head; switch means actuated by said bar when said bar is in said first position for actuating said first means, and additional means for periodically advancing said bar into a different horizontal position after a predetermined number of said sections have been stacked, whereby said sections may be counted in groups by noting the periodic offset of several of said sections.

4. An apparatus for transferring and stacking sections of elastomeric material including means to cut a continuous sheet of said material into sections; a first conveyor for transporting said sections to a first, pickup position after they are cut; a second conveyor positioned in horizontally and vertically spaced relationship with respect to said first conveyor; a stack of pallets positioned over said second conveyor, means for periodically moving said second conveyor a predetermined distance and at predetermined intervals of time and for simultaneously depositing a first pallet on said conveyor; the position of said first pallet corresponding to a second deposit position; said first pickup position and said second deposit position being at two different levels and horizontally spaced from each other; a pickup head having column means for rotatively supporting said head positioned between said first and second conveyors and between said first and second positions; first means for lowering and raising said head over said first and second positions and for rotating said head around said column means; second means to pick up a section of said material by means of said head immediately after said section reaches said first position, and to release said section after said head is transferred to said second position; and a sequence control mechanism for actuation of said first and second means, said mechanism comprising: third means for actuating said first means to lower said head toward said first conveyor only when said head is positioned directly above said first conveyor and when a sheet section is positioned on said first conveyor directly below said head in said first position; fourth means for actuating said first means to raise said head and for simultaneously actuating said second means to pick up said sheet section when said head is in said first position; fifth means for actuating said first means after the operation of said fourth means to cause said head to swing from the first position to the second position; sixth means for actuation of said first means only after operation of said fifth means to lower said sheet section to said second conveyor, seventh means for actuation of said first means at a time sufficiently later to permit said head to travel to said second position to cause said head to be raised and to be moved to said first position, and for actuation of said second means to cause said second means to release said section when said head is in said second position.

5. An apparatus for cutting and stacking elastomeric material, including means for cutting a continuous sheet of said material into sheet sections, a first conveyor to transport said sections after they are cut to a first pickup position, and a machine for stacking said sections including a pickup head having resilient cup means, first means for lowering and raising said head, second means alternately to evacuate and release vacuum in said resilient cup means; a second pallet conveyor having a pallet deposited on said second conveyor to receive said sections, and third means to move said head horizontally from a first position above the conveyor belt to a second position above said pallet; each of said means being electrically operable, and electrical power means for moving said pallet conveyor periodically after a predetermined stack of sheet sections of a predetermined height has been stacked on said pallet, a device for operating said power means, said device comprising: a first relay, a switch responsive to the movement of said pallet by said pallet conveyor only a predetermined indexing distance spaced from said second position, a time delay relay for de-actuation of said first and second means to cause said resilient cup means to be connected to the atmosphere and said head to be raised when said head is moved to said second position, a first pair of normally opened contacts of said switch being serially connected with a second pair of normally opened contacts of said time delay relay and said first relay, said first relay having a third pair of normally opened self-locking contacts connected serially with a pair of normally closed indexing contacts, said indexing contacts being opened by movement of said pallet conveyor said predetermined indexing distance, said third normally opened contacts and said normally closed indexing contacts being connected in parallel with said first and second pairs of normally opened contacts, and a fourth pair of normally opened contacts of said first relay connected serially with said power means, said power means thereby being de-energized when said first relay is de-energized.

6. An apparatus for cutting, stacking and transporting stacks of elastomeric material sections, including a first conveyor for transporting a continuous sheet of said material, a sheet cutter positioned at the end of said first conveyor for cutting said sheet into sections, a second conveyor for receiving said sections and transporting them to a pickup position, a third conveyor positioned in spaced relationship from said second conveyor, and at a different level than said second conveyor, a stack of pallets resting over said third conveyor, means for automatically depositing a single pallet in a second position on top of said third conveyor, a pickup head having a supporting column positioned between said second and third conveyors, said head having pickup means for picking up and releasing said sections; first means for raising and lowering said head selectively first over said second conveyor and then over said third conveyor and for moving and simultaneously rotating said head a predetermined angle from a position spaced from and above said third conveyor, second means for actuating said pickup means when said head is disposed directly above said first position and for de-activating said pickup means when said head is over said third conveyor, and means for advancing said third conveyor a predetermined distance after a predetermnied number of sections has been deposited on said pallet by said head, and then automatically stopping said third conveyor.

7. The apparatus as defined in claim 6 which also includes a stop bar over said second conveyor to actuate said first means for lowering said head over said second conveyor until said head rests on said section and then immediately actuating said pickup means for picking up said section.

8. An apparatus as defined in claim 6 including a stop bar over said second conveyor to actuate said first means for lowering said head over said second conveyor for picking up a sheet section in response to the movement of a sheet section against said stop bar; and a guide bar extending in the direction of movement of said second conveyor to cooperate with said stop bar to position each successive sheet section with the same orientation with respect to said head; said stop bar being at right angle with respect to the longitudinal axis of said second conveyor and said guide bar being positioned along said second conveyor and perpendicular to said stop bar; each successive sheet section being rectangularly shaped, said stop bar and guide bar maintaining all sections in the same uniform position with respect to said stop bar and said guide bar.

9. An apparatus for cutting, stacking and transporting elastomeric material originally appearing in a continuous sheet form, including means for cutting the sheet into sheet sections, a first conveyor to transport said sections after they are cut, a second conveyor in spaced relationship with respect to said first conveyor, and a machine for picking up said sections off said first conveyor and then stacking them on said second conveyor, said machine including a pickup head having resilient cup means; first means for lowering and raising said head selectively over said first conveyor and said second conveyor and to move said head from a first position spaced from and above said first conveyor to a second position spaced from and above said second conveyor; second means connecting said cup means to vacuum when said head is in said first position and for breaking said vacuum when said head is in said second position, a stop bar to hold a sheet section in a substantially stationary horizontal position on said first conveyor; and means periodically to position said stop bar in a different horizontal position after a predetermined number of said sheet sections have been removed from said first conveyor and stacked on said second conveyor, whereby said sheet sections may be easily counted by noting the periodic offset of several of said sheet sections by the periodic movement of said stop bar.

10. An apparatus for cutting, stacking and transporting elastomeric material originally appearing in a continuous sheet form, including means for cutting said sheet into sheet sections, a first conveyor for thereafter transporting said sections to a first position, a second conveyor in a laterally and vertically spaced position with respect to said first conveyor, a machine for picking up said sections at said first position and stacking them in a second position on said second conveyor; said machine comprising a pickup head including pickup cup means; first means for lowering and raising said head selectively over said first and second positions and to move said head from said first position to said second position and simultaneously turn said head a predetermined angle upon said head reaching said second position; said first means including a rotatable arm, a cylinder mounted vertically on said arm, and a piston in said cylinder attached to said head; second means connecting said cup means to vacuum when said head is in said first position and for breaking said vacuum when said cup means and said head are in said second position; a fixed support member having a bracket extending therefrom; first and second members pivotally connected from said arm and said bracket respectively; and a dash-pot connected between said first and second members, said arm being adapted to swing through an angle sufficiently large to cause said first member to move toward said second member and then to move away from said second member and simultaneously turn said head through said predetermined angle.

References Cited in the file of this patent

UNITED STATES PATENTS

| | | |
|---|---|---|
| 1,278,537 | Wegner | Sept. 10, 1918 |
| 1,366,938 | Renz | Feb. 1, 1921 |
| 1,691,552 | Newnam | Nov. 13, 1928 |
| 1,882,403 | Maxson | Oct. 11, 1932 |
| 1,892,200 | Anderson | Dec. 27, 1932 |
| 2,117,797 | Flynn et al. | May 17, 1938 |

(Other references on following page)

UNITED STATES PATENTS

| | | |
|---|---|---|
| 2,151,136 | Moffitt | Mar. 21, 1939 |
| 2,346,194 | Sjostrom | Apr. 11, 1944 |
| 2,427,223 | Moore | Sept. 9, 1947 |
| 2,470,795 | Socke | May 24, 1949 |
| 2,524,846 | Socket et al. | Oct. 10, 1950 |
| 2,598,222 | Cahners et al. | May 27, 1952 |
| 2,619,237 | Socke | Nov. 25, 1952 |
| 2,634,117 | Bloxham | Apr. 7, 1953 |
| 2,665,013 | Socke | Jan. 5, 1954 |
| 2,666,562 | Birch | Jan. 19, 1954 |
| 2,698,097 | Magnani | Dec. 28, 1954 |
| 2,833,426 | Bosken | May 6, 1958 |
| 2,862,633 | Stiles | Dec. 2, 1958 |